(12) United States Patent
Chien et al.

(10) Patent No.: US 11,630,882 B2
(45) Date of Patent: Apr. 18, 2023

(54) ADAPTATION OF ONE SHOT MACHINE LEARNING MODEL TRAINED ON OTHER REGISTERED IMAGES OF OTHER CONTENT FOR USAGE TO INSTEAD IDENTIFY WHETHER INPUT IMAGE INCLUDES CONTENT OF REGISTERED IMAGES

(71) Applicant: Hewlett-Packard Development Company, L.P., Spring, TX (US)

(72) Inventors: Pei-Yuan Chien, Taipei (TW); Hong-Wei Chou, Taipei (TW); Peter Zhang, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 42 days.

(21) Appl. No.: 17/238,887

(22) Filed: Apr. 23, 2021

(65) Prior Publication Data
US 2022/0343114 A1 Oct. 27, 2022

(51) Int. Cl.
G06K 9/62 (2022.01)
G06F 18/214 (2023.01)
G06F 18/22 (2023.01)

(52) U.S. Cl.
CPC .......... *G06F 18/2155* (2023.01); *G06F 18/22* (2023.01)

(58) Field of Classification Search
None
See application file for complete search history.

(56) References Cited

U.S. PATENT DOCUMENTS

| 2015/0242690 A1* | 8/2015 | Richert ............... G06N 3/08 382/103 |
| 2021/0150747 A1* | 5/2021 | Liu ............... G06N 3/0454 |
| 2022/0230310 A1* | 7/2022 | Xie ............... G06T 7/12 |
| 2022/0237799 A1* | 7/2022 | Price ............... G06T 7/174 |

* cited by examiner

*Primary Examiner* — Tahmina N Ansari
(74) *Attorney, Agent, or Firm* — Quarles & Brady LLP

(57) ABSTRACT

Registered, first unregistered, and second unregistered encodings are generated for registered images of content, first unregistered images of the content, and second unregistered images of different content, respectively. First and second distance matrices having rows respectively corresponding to the first and second unregistered encodings are generated based on the registered encodings and the first and second unregistered encodings, respectively. A statistic is selected having a greatest difference between first and second distance vectors having values corresponding to the rows of the first and second distance matrices, respectively. Whether content of a new unregistered image corresponds to the content of the registered images is assessed by using the selected statistic.

19 Claims, 9 Drawing Sheets

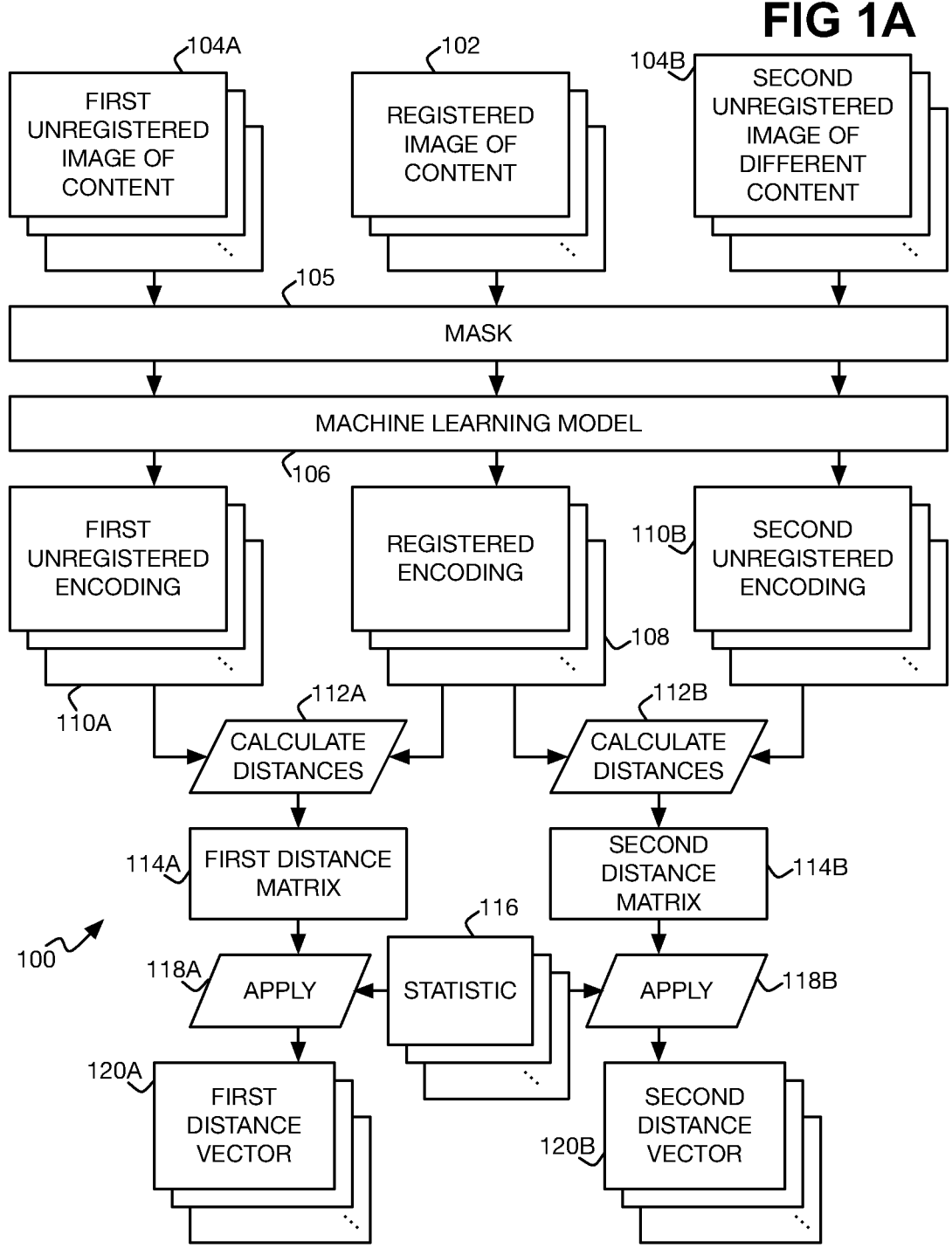

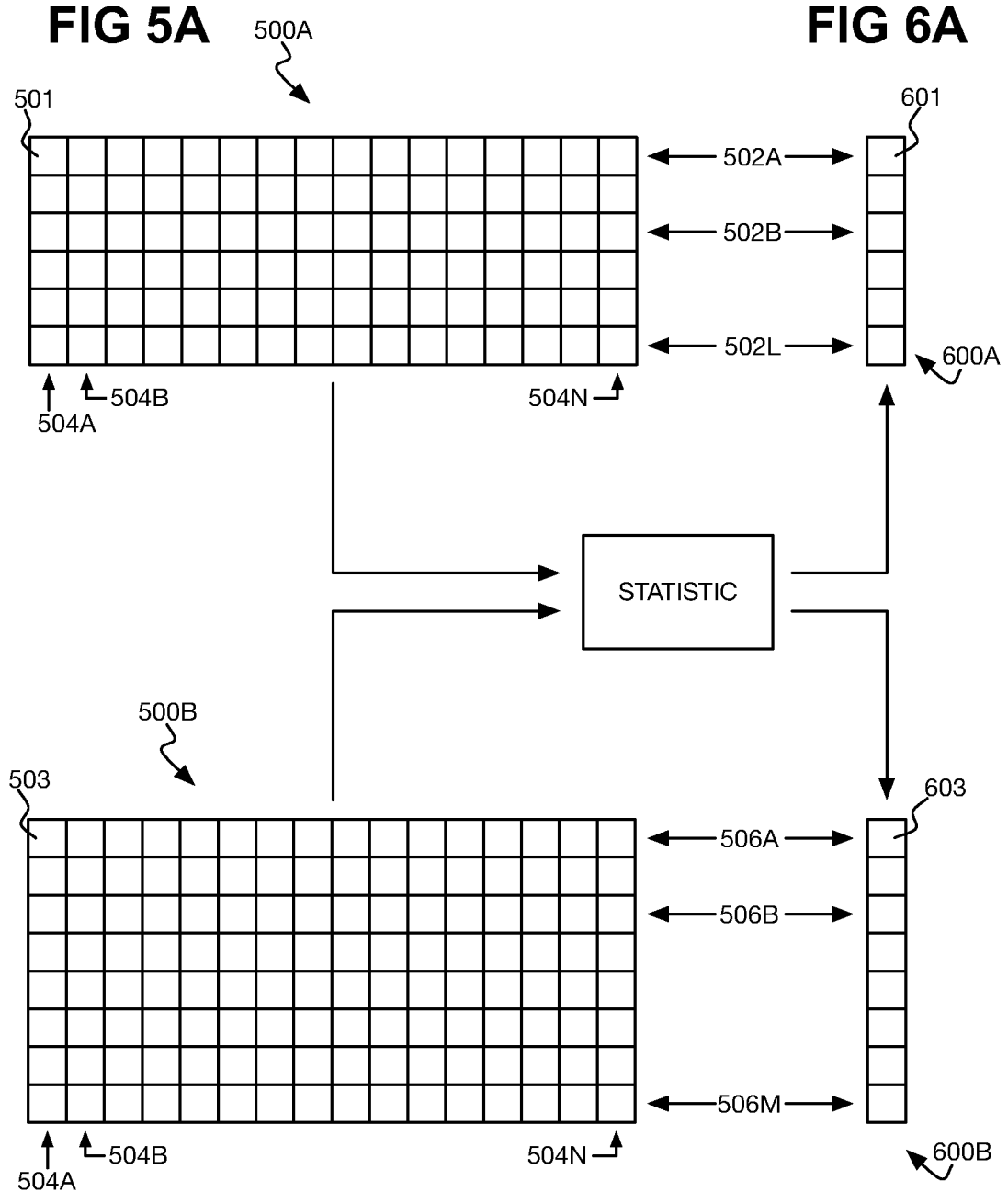

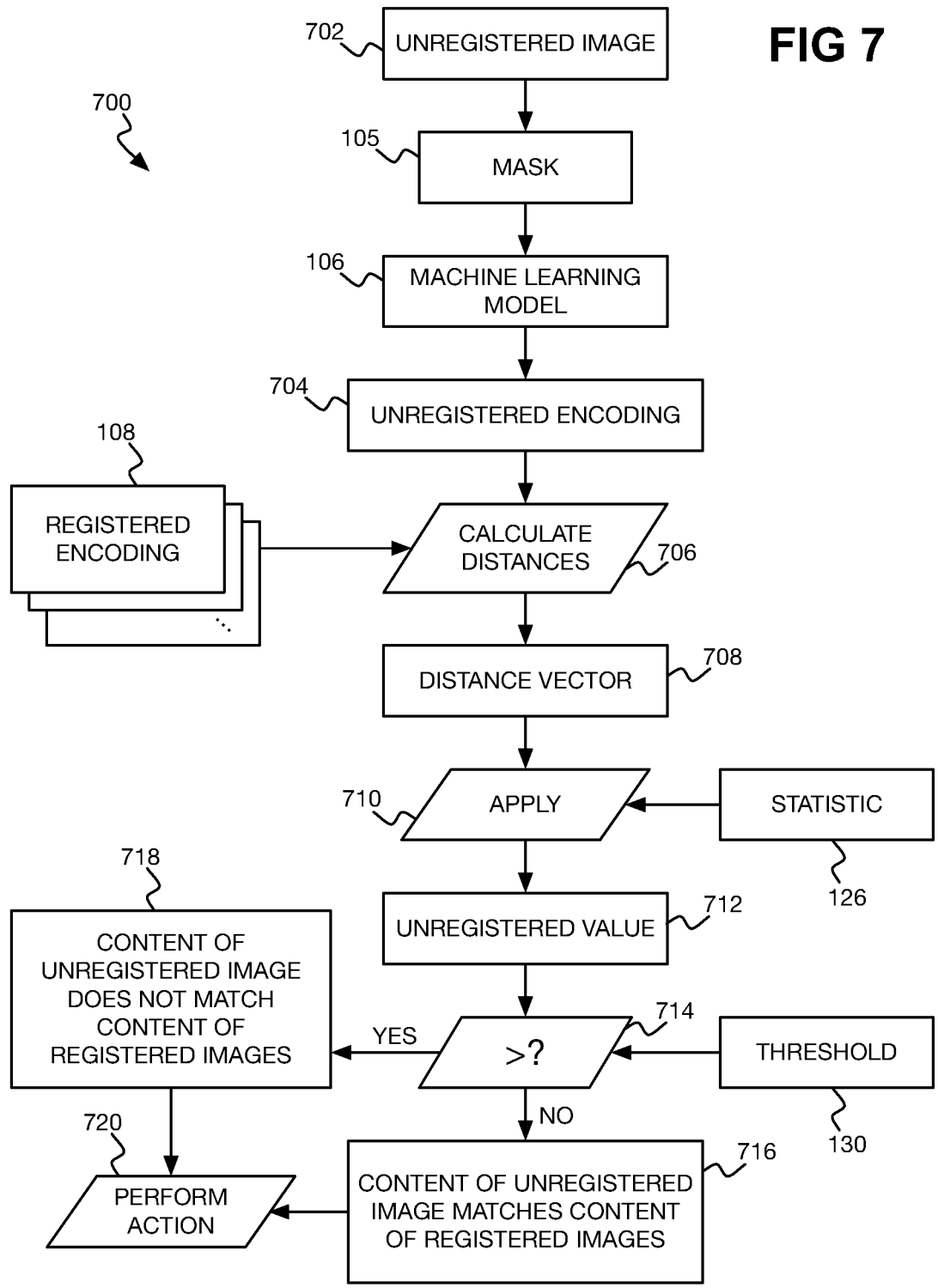

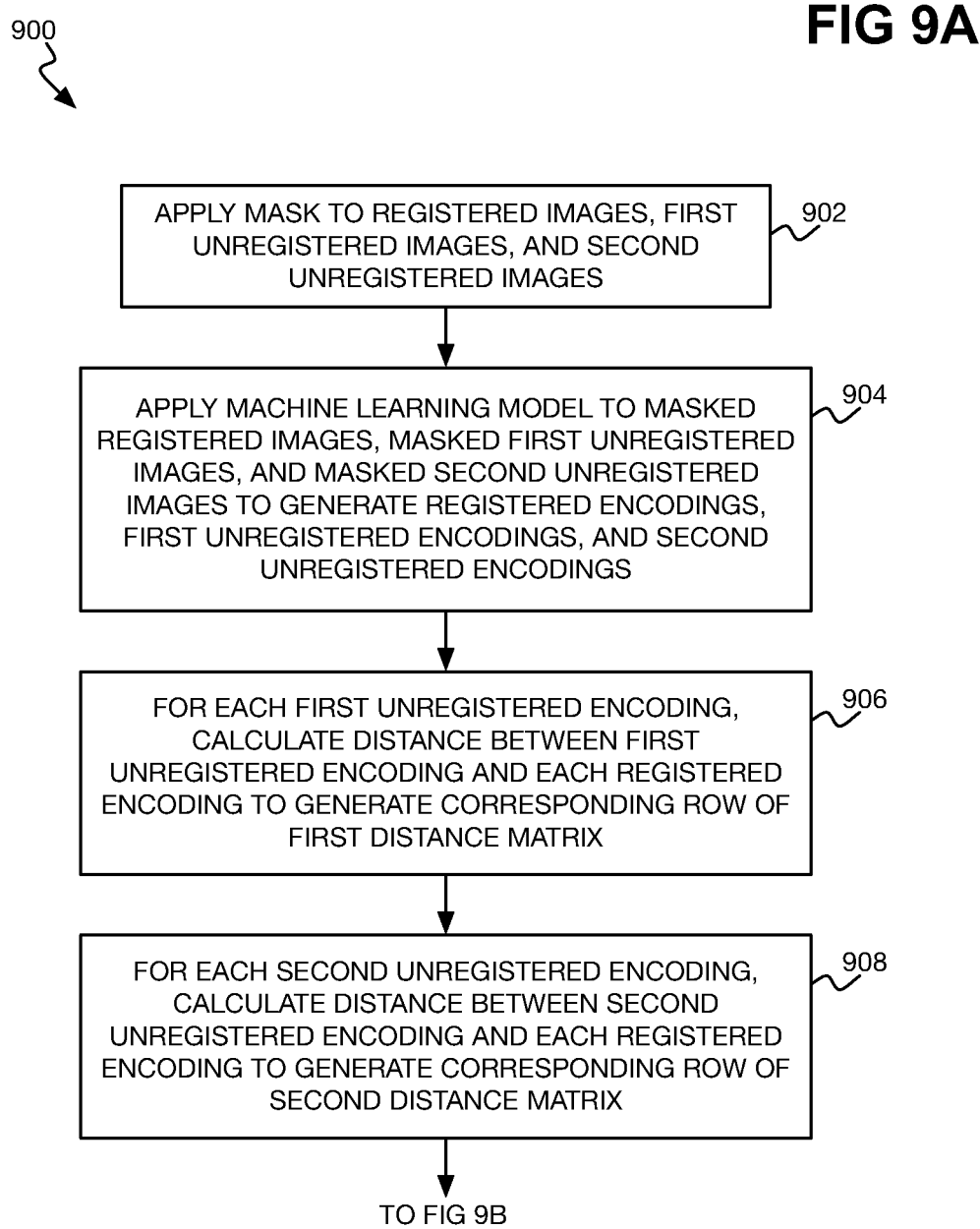

ADAPTATION OF ONE SHOT MACHINE LEARNING MODEL TRAINED ON OTHER REGISTERED IMAGES OF OTHER CONTENT FOR USAGE TO INSTEAD IDENTIFY WHETHER INPUT IMAGE INCLUDES CONTENT OF REGISTERED IMAGES

BACKGROUND

Machine learning models are used in a variety of different applications, including content recognition to determine whether the content of an unregistered image matches content of registered images. For example, for facial recognition, a new image of a person's face may be compared to different facial images of known people to identify the person appearing in the new image. One type of machine learning model that is used for such content recognition application is the one shot machine learning model, in which an encoding of an image is compared to encodings of images of content of interest to determine whether the content of the unregistered image matches the content of interest.

BRIEF DESCRIPTION OF THE DRAWINGS

FIGS. 1A and 1B are diagrams of an example process by which a statistic can be selected and an associated threshold can be determined for subsequent usage to assess whether content of an unregistered image corresponds to the content of registered images.

FIGS. 5A and 5B are diagrams of example first and second distance matrices of the distance between each of a number of registered images of content and each of a number of (first) unregistered images of the same content and a number of (second) unregistered images of different content, respectively.

FIGS. 6A and 6B are diagrams of example first and second distance vectors respectively corresponding to the example first and second distance matrices of FIGS. 5A and 5B and that have vector values that each correspond to application of a statistic to a corresponding matrix row.

FIG. 7 is a diagram of an example process for using a selected statistic and an associated threshold to assess whether content of a (new) unregistered image corresponds to the content of registered images.

FIGS. 9A and 9B are flowcharts of an example method.

DETAILED DESCRIPTION

Figure 1B:
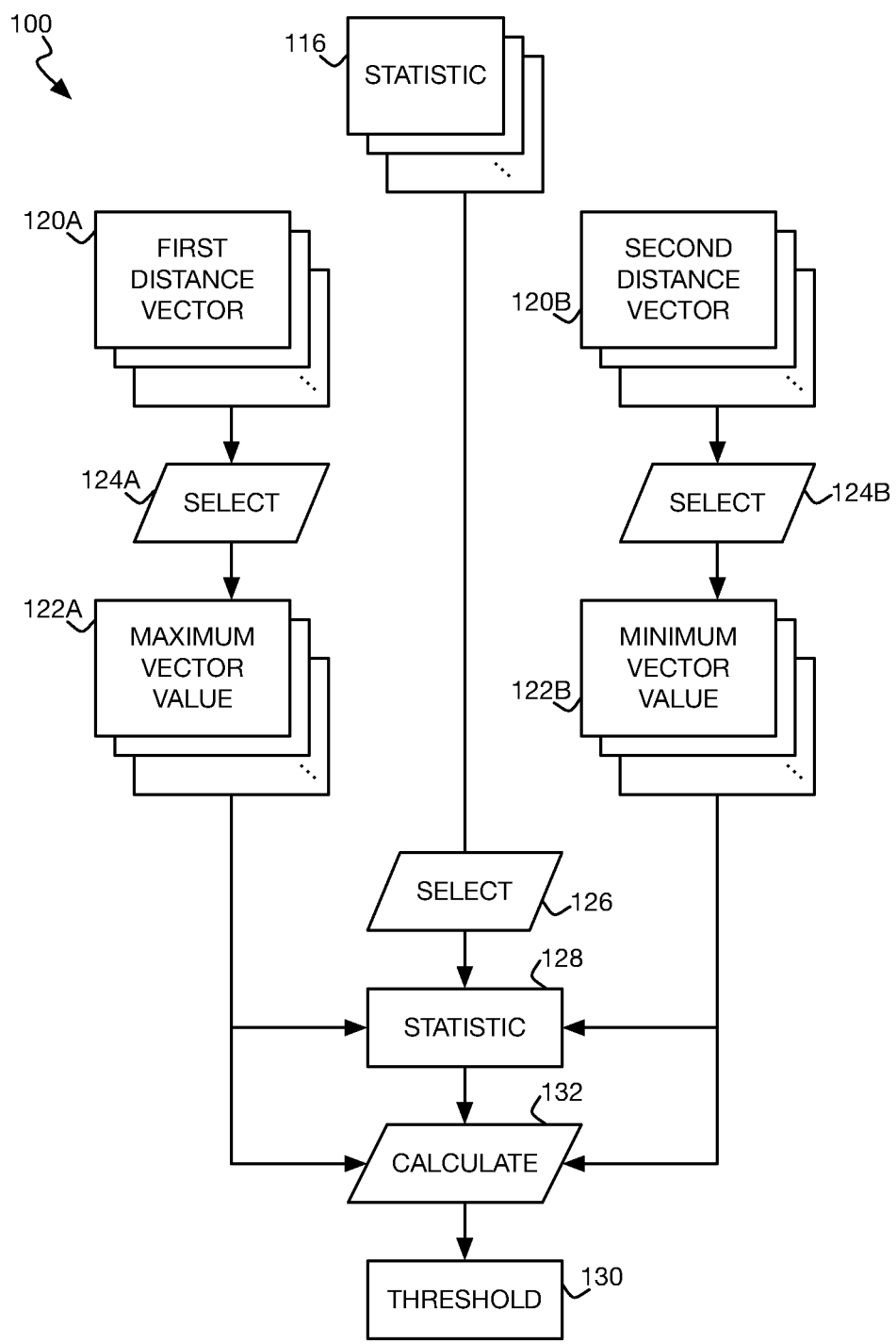

As noted in the background, machine learning models, such as one shot machine learning models, can be used for content recognition. The images of content of interest used to determine whether a new image includes this content are referred to as registered images, whereas other images (of the content of interest or of different content) are referred to as unregistered images. Registered images may be input into an already trained machine learning model to generate corresponding registered encodings, and an unregistered image may be input into the same machine learning model to generate an unregistered encoding. The unregistered encoding can then be compared to the registered encodings to assess whether the content of the unregistered image corresponds to (e.g., matches) the content of the registered images.

Machine learning models generally, and one shot machine learning models more specifically, that are trained on the basis of images of particular content of interest may not be readily adapted for usage with images of other content of interest. For example, a machine learning model may be trained on specific registered images of content to generate encodings that can be accurately used to identify whether the content of an unregistered image matches the content of these registered images. However, using this trained machine learning model to identify whether the content of an unregistered image matches different content of other registered images may result in reduced accuracy.

Furthermore, one shot and other types of machine learning models can suffer from reduced accuracy if unexpected objects appear in unregistered images of what is otherwise the same content as the content of the registered images. A machine learning model may conclude that such an unregistered image does not include the same content as the registered images when in fact it does, in other words. In addition, one shot and other types of machine learning models can have reduced accuracy if unregistered images capture the same content as the registered images, but at different angles relative to the content.

Techniques described herein ameliorate these and other issues. A trained machine learning model, such as a one shot machine learning model, is applied to registered images of content to generate registered encodings, as well as to (first) unregistered images of the same content and to (second) unregistered images of different content to generate first and second unregistered encodings, respectively. A statistic differentiating between distances between the first unregistered encodings and the registered encodings and the distances between the second unregistered encodings and the registered encodings is selected, and an associated threshold for this statistic determined.

To determine whether a new unregistered image has the same or different content as the registered images, the same trained machine learning model can be applied to the new unregistered image to generate a new unregistered encoding. The selected statistic is applied to the distances between the new unregistered encoding and the registered encodings, with the resulting value compared to the threshold. If the value is less than the threshold, then the content of the new unregistered image matches the content of the registered images.

The machine learning model in question therefore does not have to be retrained for different registered images of different content. That is, to use a given trained machine learning model to recognize different content, just a statistic and associated threshold have to be selected and determined, respectively, for each content. Far fewer registered images (and first and second unregistered images) have to be used to select a statistic and determine an associated threshold for recognized new content, as compared to machine learning model retraining. For example, instead of thousands (or more) images for model training purposes, just tens (or fewer) images may be used for statistic selection and threshold determination.

Furthermore, to compensate for unexpected objects that may appear in an unregistered image of otherwise the same content as the registered images, a mask associated with the content may be applied to each registered and unregistered image during statistic selection and threshold determination, as well as during usage of the selected statistic and the determined threshold. The mask corresponds to an area within the images at which unexpected objects are likely to appear, without or minimally obfuscating the content of interest. To compensate for unregistered images capturing the same content as the registered images but at different angles, during statistic selection and threshold determination registered and (first) unregistered images of the content at varying angles can be used.

FIGS. 1A and 1B show an example process 100 for selecting a statistic and determining an associated threshold for subsequent content recognition (e.g., matching) purposes. The process 100 may be performed by a processor of a computing device, and may be implemented as program code stored on a non-transitory computer-readable medium and executed by the processor. Referring first to FIG. 1A, images of content of interest include multiple registered images 102 and (first) unregistered images 104A. The images 102 and 104A can capture the content of interest at varying angles. The registered images 102 will subsequently be used to determine whether a new image includes the content of interest, whereas the unregistered images 104A are used just for statistic selection and threshold determination purposes.

There are also multiple (second) unregistered images 104B of different content—i.e., of content other than the content of interest—and which may also capture such different content at varying angles. The first and second unregistered images 104A and 104B are collectively referred to as the unregistered images 104. In general, the more registered images 102, the more first unregistered images 104A, and the more second unregistered images 104B, the better the resulting statistic selection and threshold determination will be.

However, the process 100 has been shown to yield accurate results even with a minimal number of registered images 102 and unregistered images 104. For instance, the numbers of registered images 102, first unregistered images 104A, and second unregistered images 104B may be on the order of tens or fewer. As one particular example, 27 registered images 102, five first unregistered images 104A, and nine unregistered images 104B has proven to be sufficient for selection of a statistic and determination of an associated threshold that can be used to assess whether a new unregistered image has content corresponding to (e.g., matching) the content of interest of the registered images 102.

A mask 105 can be applied to each of the registered images 102 and each of the unregistered images 104. The mask is associated with the content of interest of the registered images 102, and masks out areas within the images 102 in which unexpected objects other than the content of interest may appear, without completely obfuscating the content of interest. A previously trained machine learning model 106, such as a one shot machine learning model, is applied to the masked registered images 102 to generate (i.e., correspondingly output) respective registered encodings 108. The machine learning model 106 is also applied to the masked first and second unregistered images 104A and 104B to respectively generate (i.e., correspondingly output) first and second unregistered encodings 110A and 110B, which are collectively referred to as the unregistered encodings 110.

Each encoding 108 and 110 is thus generated by applying the machine learning model 106 to a corresponding (masked) image 102 or 104. The number of registered encodings 108 is therefore equal to the number of registered images 102, and the numbers of first and second unregistered encodings 110A and 110B are equal to the numbers of first and second unregistered images 104A and 104B, respectively. Each encoding 108 and 110 may be a feature vector for a corresponding image 102 or 104, as output by the machine learning model 106.

Distances between each first unregistered encoding 110A and each registered encoding 108 are calculated (112A) to generate a first distance matrix 114A, and similarly distances between each second unregistered encoding 110B and each registered encoding 108 are calculated (112B) to generate a second distance matrix 114B. The calculated distances may be Euclidean (i.e., L2) distances, or other types of distances. The first and second distance matrices 114A and 114B are collectively referred to as the distance matrices 114. The rows of each of the first and second distance matrices 114A and 114B correspond to the first and second unregistered images 104A and 104B, respectively, and the columns of each matrix 114 correspond to the registered images 102.

Therefore, the number of rows of the first distance matrix 114A is equal to the number of first unregistered images 104A and the number of rows of the second distance matrix 114B is equal to the number of second unregistered images 104B. The number of columns of each matrix 114 is equal to the number of registered images 102. The value at the j-th row and the k-th column of the first distance matrix 114A is the calculated distance between the j-th first unregistered image 104A and the k-th registered image 102. Likewise, the value at the j-th row and the k-th column of the second distance matrix 114B is the calculated distance between the j-th second unregistered image 104B and the k-th registered image 102.

A number of statistics 116 are applied (118A) to the rows of the first distance matrix 114A to generate first distance vectors 120A that each correspond to a statistic 116, and are similarly applied (118B) to the rows of the second distance matrix 114B to generate second distance vectors 120B that also each correspond to a statistic 116. The statistics 116 may include mean, median, maximum, minimum, and so on. The first and second distance vectors 120A and 120B are collectively referred to as the distance vectors 120. The length of the first distance vector 120A is equal to the number of first unregistered images 104A, and the length of the second distance vector 120B is equal to the number of second unregistered images 104B.

Specifically, for each row of the first distance matrix 114A, a given statistic 116 is applied to the values of that row to generate a corresponding value of the first distance vector 120A for the statistic 116 in question. Likewise, for each row of the second distance matrix 114B, a given statistic 116 is applied to the values of that row to generate a corresponding value of the second distance vector 120B for the statistic 116 in question. Therefore, there is a first distance vector 120A and a second distance vector 120B for each statistic, and the number of first vectors 120A is equal to the number of statistics 116, as is the number of second distance vectors 120B.

The values of each second distance vector 120B in general should be, but may not be, greater than the values of the corresponding first distance vector 120A. This is because each second distance vector 120B is calculated based on distances between the second unregistered images 104B and the registered images 102, whereas each first distance vector 120A is calculated based on distances between the first unregistered images 104A and the registered images 102. The registered images 102 and the first unregistered images 104A are of the same content of interest, and thus the resulting distances between the images 102 and 104A should generally be less than the distances between the registered images 102 and the second unregistered images 104B, which are of different content than the content of interest.

Referring next to FIG. 1B, the maximum vector value 122A of each first distance vector 120A is selected (124A), and the minimum vector value 122B of each second distance vector 120B is selected (124B). That is, for a given statistic, the maximum vector value 122A of the first distance vector 120A for the statistic is selected, and the minimum vector value 122B of the second distance vector 120B for the statistic is selected. The maximum vector value 122A of a given first distance vector 120A is the largest value of that vector 120A, and the minimum vector value 122B of a given second distance vector 120B is the smallest value of that vector 120B. The number of maximum vector values 122A is equal to the number of statistics 116, as is the number of minimum vector values 122B.

One of the statistics 116 is selected (126), as the selected statistic 128, based on the maximum vector values 122A and the minimum vector values 122B for the statistics 116. Specifically, the selected statistic 128 is the statistic 116 having the greatest difference between its minimum vector value 122B and its maximum vector value 122A. That is, the statistic 116 having a difference between the minimum vector value 122B for this statistic 116 and the maximum vector value 122A for this statistic 116 that is the greatest is selected as the statistic 128.

The difference between the minimum vector value 122B for a statistic 116 and the maximum vector value 122A for this statistic 116 the that is considered is a signed, not absolute, difference. Because the values of each first distance vector 120A in general should be, but may not be, less than the values of the corresponding second distance vector 120B, as noted above, the maximum vector value 122A for a given statistic 116 should be, but may not be, less than the minimum vector value 122B for this statistic 116. So long as there is at least one statistic 116 for which the minimum vector value 122B is greater than the maximum vector value 122A, the statistic 128 may be selected as has been described.

However, if no statistic 116 has a minimum vector value 122B greater than its maximum vector value 122A, then a statistic 128 is not selected. This is because the encodings 108 and 110 do not properly permit recognition of the content of interest of the registered images 102 within the unregistered images 104. In this case, a different mask 105 may be selected and applied to the images 102 and 104, where the new mask 105 better distinguishes between the content of interest of the images 102 and 104A and the different content of the images 104B. The process 100 is then repeated with reapplication of the machine learning model 106 to the images 102 and 104 to which the new mask 105 has been applied.

Once the statistic 128 has been selected, an associated threshold 130 is calculated (132) for the statistic 128. The threshold 130 is calculated based on, or from, the maximum vector value 122A and the minimum vector value 122B for the selected statistic 128. For example, the threshold 130 may be calculated as an average of the maximum vector value 122A and the maximum vector value 122B for the statistic 128. The associated threshold 130 can then be used in conjunction with the selected statistic 128 to determine whether the content of a new unregistered image corresponds to (e.g., matches) the content of interest within the registered images 102.

Figure 2B:
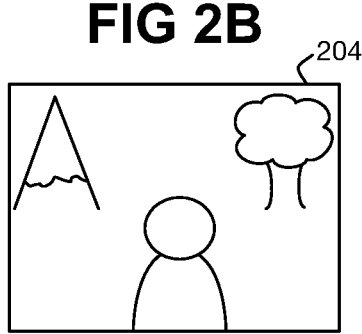
FIGS. 2A, 2B, and 2C are diagrams of an example registered image of content, an example (first) unregistered image of the same content, and an example (second) unregistered image of different content.
Figure 2A:
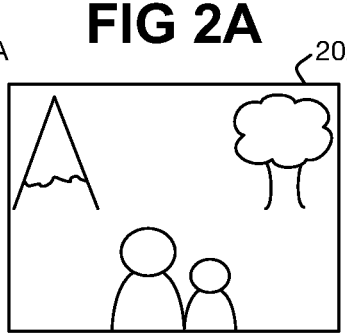
Figure 2C:
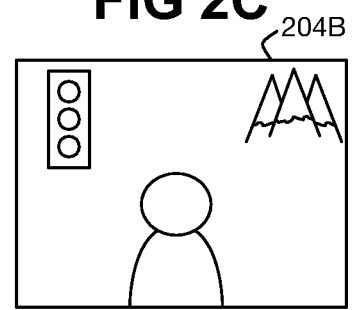

FIGS. 2A, 2B, and 2C show an example registered image 202 of content of interest, an example (first) unregistered image 204A of the content of interest, and an example (second) unregistered image 204B of different content respectively. The first and second unregistered images 204A and 204B are collectively referred to as the unregistered images 204. The images 202 and 204 are examples of the images 102 and 104, respectively, of FIG. 1.

The content of interest of the registered image 202 and the first unregistered image 204A includes one particular mountain in the upper left corner and one particular tree in the upper right corner. Each of the images 202 and 204A include (unexpected) objects that are not part of the content of interest: a couple in the image 202 and one person in the image 204A. By comparison, the different content of the second unregistered image 204B includes a traffic stoplight in the upper left corner, a mountain range of three mountains in the upper right corner, between which there is a person.

Figure 3:
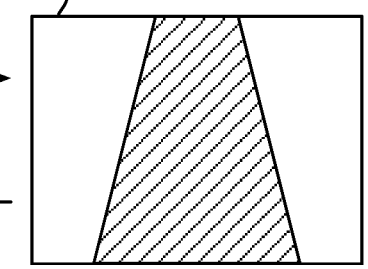
FIG. 3 is a diagram of an example mask corresponding to the content of the registered image of FIG. 2A and the content of the unregistered image of FIGS. 2B and 2C.

FIG. 3 shows an example mask 305 that corresponds to or is associated with the content of interest of the images 202 and 204A. The mask 305 includes a shaded area that masks out the unexpected objects that are not part of the content of interest in the images 202 and 204A. The mask 305 may be manually created by a user, or may be created in automated fashion in consideration of the areas of the images 202 and 204A that include the content of interest.

Figure 4B:
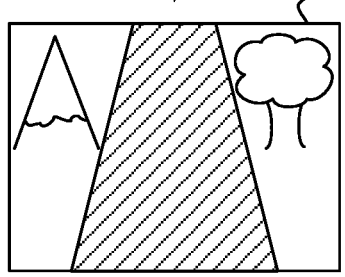
FIGS. 4A, 4B, and 4C are diagrams of the example images of FIGS. 2A, 2B, and 2C, respectively, after application of the example mask of FIG. 3.
Figure 4A:
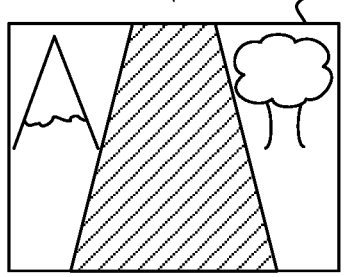
Figure 4C:
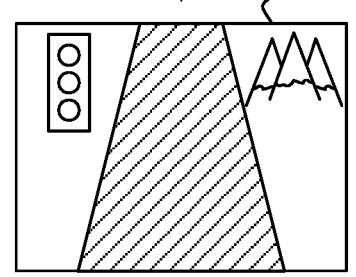

FIGS. 4A, 4B, and 4C show an example registered image 402, an example (first) unregistered image 404A, and an example (second) registered image 404B, respectively. The first and second unregistered images 404A and 404B are collectively referred to as the unregistered images 404. The images 402 and 404 correspond to the images 202 and 204 after application of the mask 305. Therefore, the unexpected objects in the images 402 and 404A of the content of interest have been masked out, as well as the person between the stoplight and the mountain range in the image 404B.

FIGS. 5A and 5B show example first and second distance matrices 500A and 500B, respectively. The first and second distance matrices 500A and 500B are examples of the first and second distance matrices 114A and 114B, respectively, and are collectively referred to as the distance matrices 500. The first distance matrix 500A is generated based on distances between registered encodings of registered images of content of interest and (first) unregistered encodings of (first) unregistered images of the content of interest. The second distance matrix 500B is generated based on distances between the registered encodings of the registered images and (second) unregistered encodings of (second) unregistered images of different content.

The first distance matrix 500A has rows 502A, 502B, . . . , 502L, which are collectively referred to as the rows 502. The number of rows 502 is equal to the number of first unregistered images. The first distance matrix 500A has columns 504A, 504B, . . . , 504N, which are collectively referred to as the columns 504. The number of columns 504 is equal to the number of registered images. In the example, there are six first unregistered images and thus six rows 502, and there are sixteen registered images and thus sixteen columns 504. The first distance matrix 500A has values 501 that are each equal to the calculated distance between the registered encoding of the registered image corresponding to the column 504 in question and the first unregistered encoding of the first unregistered image corresponding to the row 502 in question.

The second distance matrix 500B has rows 506A, 506B, ..., 506M, which are collectively referred to as the rows 506. The number of rows 506 is equal to the number of second unregistered images. The second distance matrix 500B also has the columns 504A, 504B, ..., 504N. The number of columns 504 is again equal to the number of registered images. In the example, there are eight second unregistered images and thus eight rows 506, and there are sixteen registered images and thus sixteen columns 504. The second distance matrix 500B has values 503 that are each equal to the calculated distance between the registered encoding of the registered image corresponding to the column 504 in question and the second unregistered encoding of the second unregistered image corresponding to the row 506 in question.

FIGS. 6A and 6B show example first and second distance vectors 600A and 600B, respectively. The first and second distance vectors 600A and 600B are examples of the first and second distance vectors 120A and 120B, respectively, and are collectively referred to as the distance vectors 600. The first distance vector 600A is generated based on application of a given statistic to the rows 502 of the first distance matrix 500A, and the second distance vector 600B is similarly generated based on application of this statistic to the rows 506 of the second distance matrix 500B. The distance vectors 600 are therefore those that correspond to this statistic.

The first distance vector 600A has values 601. The number of values 601 is equal to the number of rows 502 of the first distance matrix 500A, and therefore is equal to the number of first unregistered images. Each value 601 is calculated, or generated, by applying the statistic to the values 501 of the row 502 to which the value 601 corresponds. For example, if the statistic is mean, then a value 601 corresponding to a particular row 502 is equal to the average of the values 501 of that row 502.

The second distance vector 600B has values 603. The number of values 603 is equal to the number of rows 506 of the second distance matrix 500B, and therefore is equal to the number of second unregistered images. Each value 603 is similarly calculated, or generated, by applying the statistic to the values 503 of the row 506 to which the value 603 corresponds. As above, for example, if the statistic is mean, then a value 603 corresponding to a particular row 506 is equal to the average of the values 503 of that row 506.

FIG. 7 shows an example process 700 for using a selected statistic and a calculated associated threshold to assess whether the content of a (new) unregistered image 702 matches the content of interest of the registered images 102 on which basis the statistic was selected and the associated threshold was calculated as has been described in relation to FIGS. 1A and 1B. Like the process 100 of FIGS. 1A and 1B, the process 700 may be performed by a processor of a computing device, and may be implemented as program code stored on a non-transitory computer-readable medium and executed by the processor. The same mask 105 applied in the process 100 is applied to the unregistered image 702. The same trained machine learning model 106 used in the process 100 is then applied to the resultantly masked image 702 to generate an unregistered encoding 704 of this image 702.

Distances are calculated (706) between the unregistered encoding 704 and the registered encodings 108 of the registered images 102 used in the process 100 to generate a distance vector 708. The distance vector 708 has a number of values equal to the number of registered images 102. Each value of the distance vector 708 corresponds to the distance between the unregistered encoding 704 and a corresponding registered image encoding 108. The statistic 128 selected in the process 100 is applied (710) to the distance vector 708 to generate, or calculate, what is referred to as an unregistered value (712) for the unregistered image 702.

If the unregistered value is not greater (e.g., less than) than the associated threshold 130 for the selected statistic 128 as calculated in the process 100, then the content of the unregistered image 702 corresponds to (e.g., matches) the content of the registered images 102 (716). By comparison, if the unregistered value is greater than the threshold 130 associated with the selected statistic 128 (714), then the content of the unregistered image 702 does not correspond to (e.g., does not match) the content of the registered images 102 (718). An action may then be performed (720) based or depending on whether the content of the unregistered image 702 matches the content of interest of the registered images 102.

For instance, if the content of interest is the face of a user, the process 700 is a facial recognition process, and the action that is performed may be an authentication-related action. For example, the registered images 102 may be images of the face of the user of a computing device such as a smartphone or other computing device. The computing device may be locked after a period of inactivity. For the computing device to again be used, an unregistered image 702 of the user's face is captured, and the device is unlocked for usage just if the unregistered facial image 702 matches the registered facial images 102. In this and other scenarios, therefore, the action is the operation of a computing device, in that the computing device operates (e.g., unlocks for usage) based on with whether the content of the unregistered image 702 corresponds to the content of interest of the registered images 102.

Figure 8:
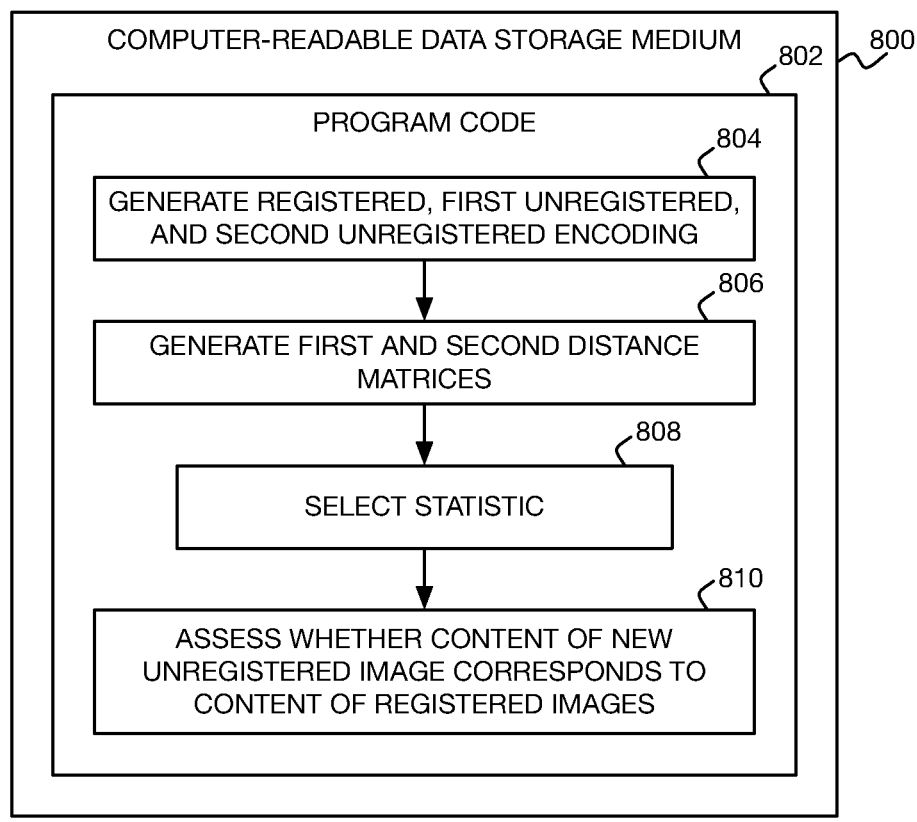
FIG. 8 is a diagram of an example non-transitory computer-readable data storage medium.

FIG. 8 shows an example non-transitory computer-readable data storage 800 medium storing program code 802 executable by a processor of a computing device to perform processing. The processing includes generating registered, first unregistered, and second unregistered encodings for registered images of content, first unregistered images of the content, and second unregistered images of different content, respectively (804). The processing includes generating first and second distance matrices having rows respectively corresponding to the first and second unregistered encodings, based on the registered encodings and the first and second unregistered encodings, respectively (806). The processing includes selecting a statistic having a greatest difference between first and second distance vectors having values corresponding to the rows of the first and second distance matrices, respectively (808), and assessing whether content of a new unregistered image corresponds to the content of the registered images by using the selected statistic (810).

Figure 9B:
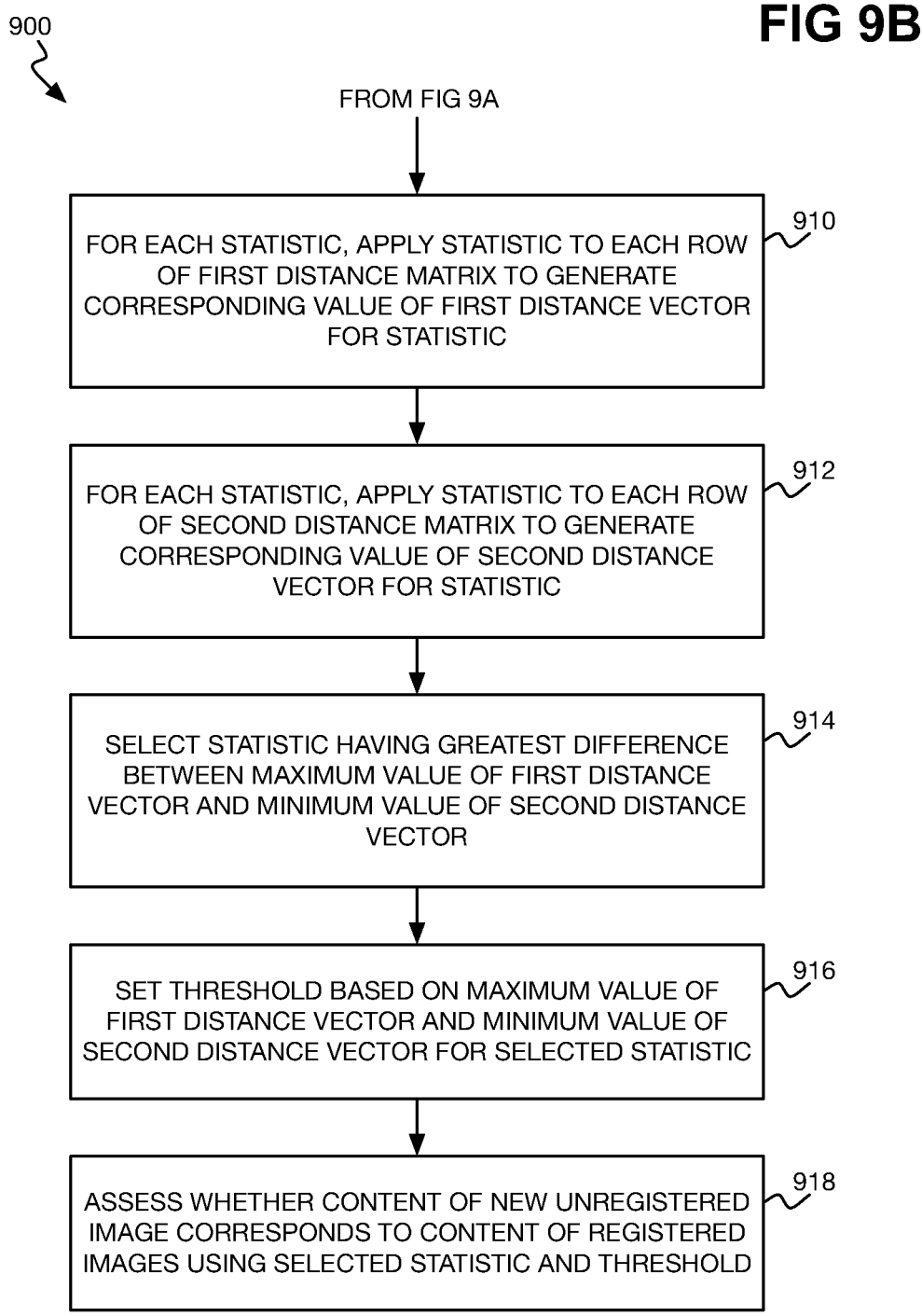

FIGS. 9A and 9B show an example method 900, which may be performed by a processor and that may be implemented as program code stored on a non-transitory computer-readable data storage medium and executed by the processor. Referring first to FIG. 9A, the method 900 includes applying a mask corresponding to content of registered images to the registered images, first unregistered images of the content, and second unregistered images of different content (902). The method 900 includes applying a machine learning model to the masked registered images, the masked first unregistered images, and the masked second unregistered images to generate registered encodings, first unregistered encodings, and second unregistered encodings, respectively (904). The method 900 includes, for each first unregistered encoding, calculating a distance between the first unregistered encoding and each registered encoding to generate a corresponding row of a first distance matrix (906). The method 900 includes for each second unregistered encoding, calculating a distance between the second unregistered encoding and each registered encoding to generate a corresponding row of a second distance matrix (908).

Referring next to FIG. 9B, the method 900 includes for each of a number of statistics, applying, the statistic to each row of the first distance matrix to generate a corresponding value of a first distance vector for the statistic (910), and applying the statistic to each row of the second distance matrix to generate a corresponding value of a second distance vector for the statistic (912). The method 900 includes selecting the statistic having a greatest difference between a maximum value of the first distance vector and a minimum value of the second distance vector (914). The method 900 includes setting a threshold based on the maximum value of the first distance vector and the minimum value of the second distance vector for the selected statistic (916). The method 900 includes assessing whether content of a new unregistered image corresponds to the content of the registered images by using the selected statistic and the threshold (918).

Figure 10:
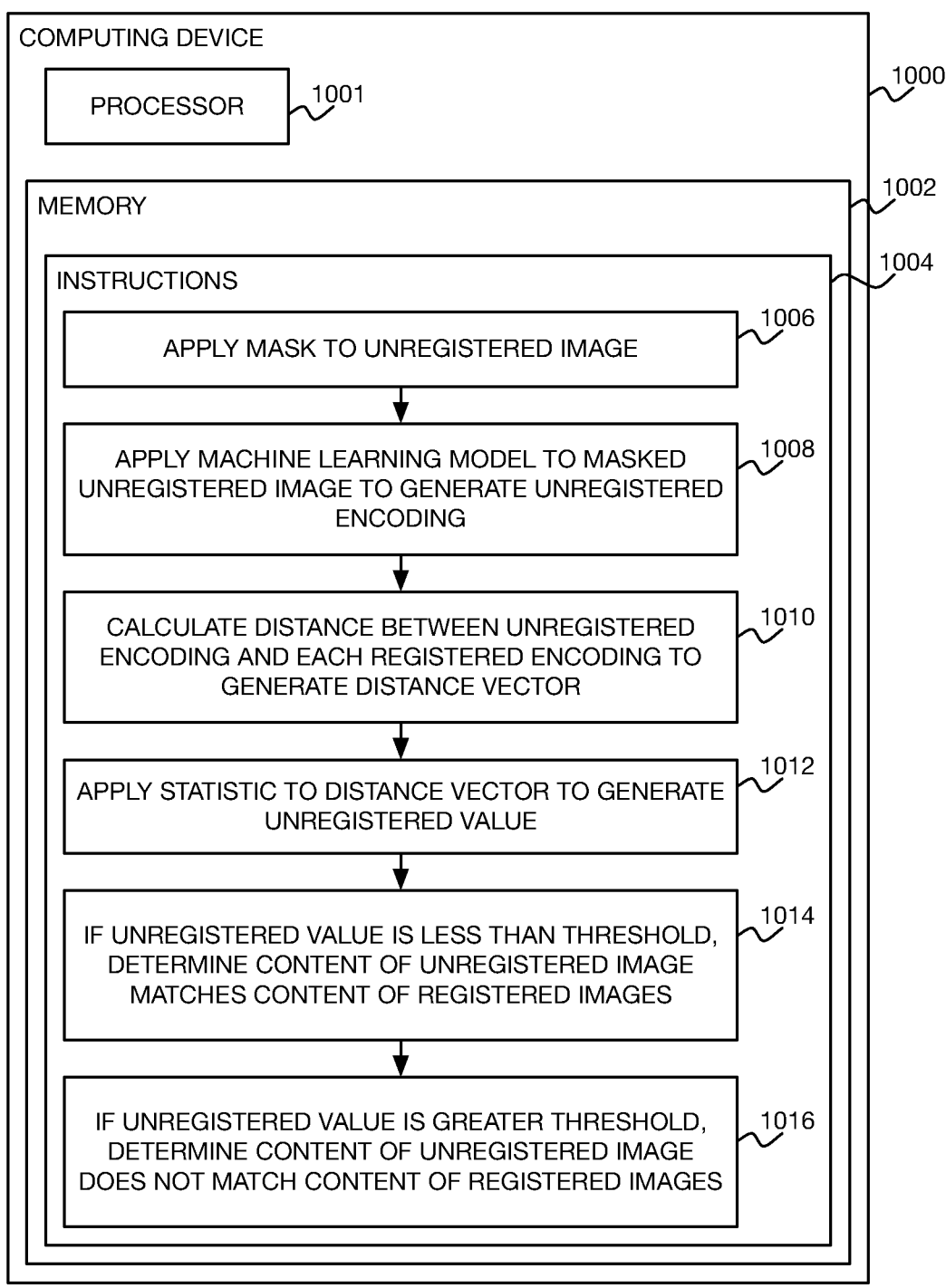
FIG. 10 is a diagram of an example computing device.

FIG. 10 shows an example computing device 1000. The computing device 1000 includes a processor 1001, and a memory 1002 storing instructions 1004 executable by the processor 1001. The instructions 1004 are executable by the processor 1001 to apply a mask corresponding to content of registered images to an unregistered image (1006). The instructions 1004 are executable by the processor 1001 to apply a machine learning model to the masked unregistered image to generate an unregistered encoding (1008).

The instructions 1004 are executable by the processor 1001 to calculate a distance between the unregistered encoding and each of a number of registered encodings to generate a distance vector (1010). Each registered encoding corresponds to application of the machine learning model to a respective registered image after application of the mask. The instructions 1004 are executable by the processor 1001 to apply a statistic to the distance vector to generate an unregistered value (1012). The statistic is selected based on analysis of the registered images vis-à-vis first unregistered images of the content and second unregistered images of different content.

The instructions 1004 are executable by the processor 1001 to determine that content of the unregistered image corresponds to the content of the registered images if the unregistered value is not greater than (e.g., less than) a threshold (1014). The threshold is determined based on analysis of the registered images vis-à-vis the first unregistered images and the second unregistered images. The instructions 1004 are executable by the processor 1001 to determine that the content of the unregistered image does not correspond to the content of the registered images if the unregistered value is greater than the threshold (1016).

Techniques have been described herein for assessing whether the content of an unregistered image corresponds to the content of interest of registered images. The same trained machine learning model can be used for different content of interest. That is, a machine learning model does not have to be retrained for different registered images of different content of interest. Rather, for different content of interest, just a corresponding statistic has to be selected and a threshold associated with the selected statistic has to be determined. A mask for each different content of interest may also be selected.

We claim:

1. A non-transitory computer-readable data storage medium storing program code executable by a processor to perform processing comprising:
   generating registered encodings for registered images of content by applying, to the registered images, a one shot machine learning model that has been trained on other registered images of other content different than the content of the registered images to identify whether an input image includes the other content;
   generating first unregistered encodings for first unregistered images of the content by applying, to the first unregistered images, the one shot machine learning model;
   generating second unregistered encodings for second unregistered images of different content different than the content of the registered images and of the first unregistered images and different than the other content of the other registered images by applying, to the second unregistered images, the one shot machine learning model;
   generating first and second distance matrices having rows respectively corresponding to the first and second unregistered encodings, based on the registered encodings and the first and second unregistered encodings, respectively;
   selecting a statistic having a greatest difference between first and second distance vectors having values corresponding to the rows of the first and second distance matrices, respectively; and
   assessing whether content of a new unregistered image corresponds to the content of the registered images by using the selected statistic,
   wherein usage of the statistic adapts the one shot machine learning model that has been trained on the other registered images of the other content for usage to instead identify whether the input image includes the content of the registered images, without retraining.

2. The non-transitory computer-readable data storage medium of claim 1, wherein the registered images of the content are captured at different angles relative to the content.

3. The non-transitory computer-readable data storage medium of claim 1, wherein the processing further comprises:
   performing an action based on whether the content of the new unregistered image corresponds to the content of the registered images.

4. The non-transitory computer-readable data storage medium of claim 1, wherein the processing further comprises:
   applying a mask associated with the content of the registered images to the registered, first unregistered, and second unregistered images prior to generating the registered, first unregistered, and second unregistered encodings.

5. The non-transitory computer-readable data storage medium of claim 1, wherein generating the first and second distance matrices comprises:
   for each first unregistered encoding, calculating a distance between the first unregistered encoding and each registered encoding to generate the row of the first distance matrix corresponding to the first unregistered encoding; and for each second unregistered encoding, calculating a distance between the second unregistered encoding and each registered encoding to generate the row of the second distance matrix corresponding to the second unregistered encoding.

6. The non-transitory computer-readable data storage medium of claim 1, wherein each row of the first distance matrix comprises distances between the first unregistered encoding to which the row corresponds and the registered encodings, and wherein each row of the second distance matrix comprises distances between the second unregistered encoding to which the row corresponds and the registered encodings.

7. The non-transitory computer-readable data storage medium of claim 6, wherein selecting the statistic comprises, for each of a plurality of statistics:

applying the statistic to the distances of each row of the first distance matrix to generate the value of the first distance vector to which the row corresponds; and applying the statistic to the distances of each row of the second distance matrix to generate the values of the second distance vector to which the row corresponds.

8. The non-transitory computer-readable data storage medium of claim 1, wherein selecting the statistic comprises, for each of a plurality of statistics:

generating the first and second distance vectors, each value of the first distance vector corresponding to application of the statistic to a respective row of the first distance matrix, and each value of the second distance vector corresponding to application of the statistic to a respective row of the second distance matrix.

9. The non-transitory computer-readable data storage medium of claim 1, wherein selecting the statistic having the greatest difference between the first and second distance vectors comprises:

selecting the statistic having the greatest difference between a maximum value of the first distance vector and a minimum value of the second distance vector.

10. The non-transitory computer-readable data storage medium of claim 9, wherein the processing further comprises:

setting a threshold based on the maximum value of the first distance vector and the minimum value of the second distance vector for the selected statistic, wherein the threshold is used in conjunction with the selected statistic to assess whether the content of the new unregistered image corresponds to the content of the registered images.

11. The non-transitory computer-readable data storage medium of claim 10, wherein setting the threshold comprises:

setting the threshold to an average of the maximum value of the first distance vector and the minimum value of the second distance vector for the selected statistic.

12. The non-transitory computer-readable data storage medium of claim 10, wherein assessing whether the content of the new unregistered image corresponds to the content of the registered images comprises:

generating an unregistered encoding for the new unregistered image;

generating a distance vector having values that each correspond to a distance between the unregistered encoding and a corresponding registered encoding;

applying the selected statistic to the distance vector to generate an unregistered value;

determining that the content of the new unregistered image corresponds to the content of the registered images if the unregistered value is less than the threshold; and determining that the content of the new unregistered image does not correspond to the content of the registered images if the unregistered value is greater than the threshold.

13. A method comprising:

applying, by a processor, a mask corresponding to content of registered images to the registered images, first unregistered images of the content, and second unregistered images of different content;

applying, by the processor, a one shot machine learning model to the masked registered images to generate registered encodings, the one shot machine learning model having been trained on other registered images of other content different than the content of the registered images to identify whether an input image includes the other content;

applying, by the processor, the one shot machine learning model to the masked first unregistered images to generate first unregistered encodings;

applying, by the processor, the one shot machine learning model to the masked second unregistered images to generate second unregistered encodings;

for each first unregistered encoding, calculating, by the processor, a distance between the first unregistered encoding and each registered encoding to generate a corresponding row of a plurality of rows of a first distance matrix;

for each second unregistered encoding, calculating, by the processor, a distance between the second unregistered encoding and each registered encoding to generate a corresponding row of a plurality of rows of a second distance matrix;

for each of a plurality of statistics, applying, by the processor, the statistic to each row of the first distance matrix to generate a corresponding value of a plurality of values of a first distance vector for the statistic;

for each statistic, applying, by the processor, the statistic to each row of the second distance matrix to generate a corresponding value of a plurality of values of a second distance vector for the statistic;

selecting, by the processor, the statistic having a greatest difference between a maximum value of the first distance vector and a minimum value of the second distance vector;

setting, by the processor, a threshold based on the maximum value of the first distance vector and the minimum value of the second distance vector for the selected statistic; and assessing, by the processor, whether content of a new unregistered image corresponds to the content of the registered images by using the selected statistic and the threshold, wherein usage of the statistic having the greatest difference adapts the one shot machine learning model that has been trained on the other registered images of the other content for usage to instead identify whether the input image includes the content of the registered images, without retraining.

14. The method of claim 13, wherein assessing whether the content of the new unregistered image corresponds to the content of the registered images comprises:
applying the mask to the new unregistered image;
applying the machine learning model to the masked new unregistered image to generate an unregistered encoding;
calculating a distance between the unregistered encoding and each registered encoding to generate a distance vector;
applying the selected statistic to the distance vector to generate an unregistered value;
determining that the content of the new unregistered image corresponds to the content of the registered images if the unregistered value is less than the threshold; and
determining that the content of the new unregistered image does not correspond to the content of the registered images if the unregistered value is greater than the threshold.

15. The method of claim 13, wherein the registered images of the content are captured at different angles relative to the content.

16. The method of claim 13, further comprising:
performing an action based on whether the content of the new unregistered image corresponds to the content of the registered images.

17. The method of claim 13, wherein setting the threshold comprises:
setting the threshold to an average of the maximum value of the first distance vector and the minimum value of the second distance vector for the selected statistic.

18. A computing device comprising:
a processor; and
a memory storing instructions executable by the processor to:
apply a mask corresponding to content of registered images to an unregistered image;
apply a one shot machine learning model to the masked unregistered image to generate an unregistered encoding, the one shot machine learning model having been trained on other registered images of other content different than the content of the registered images to identify whether an input image includes the other content;
calculate a distance between the unregistered encoding and each of a plurality of registered encodings to generate a distance vector, each registered encoding corresponding to application of the one shot machine learning model to a respective registered image after application of the mask;
apply a statistic to the distance vector to generate an unregistered value, the statistic selected based on analysis of the registered images vis-à-vis first unregistered images of the content and second unregistered images of different content;
determining that content of the unregistered image corresponds to the content of the registered images if the unregistered value is less than a threshold determined based on analysis of the registered images vis-à-vis the first unregistered images and the second unregistered images; and
determining that the content of the unregistered image does not correspond to the content of the registered images if the unregistered value is greater than the threshold,
wherein usage of the statistic adapts the one shot machine learning model that has been trained on the other registered images of the other content for usage to instead identify whether the input image includes the content of the registered images, without retraining.

19. The computing device of claim 18, wherein the instructions are executable by the processor to further:
perform an action based on whether the content of the unregistered image corresponds to the content of the registered images.

* * * * *